United States Patent
Shin et al.

(10) Patent No.: US 9,484,591 B2
(45) Date of Patent: *Nov. 1, 2016

(54) VOLTAGE SENSING MEMBER AND BATTERY MODULE EMPLOYED WITH THE SAME

(75) Inventors: Yong Shik Shin, Daejeon (KR); Hee Kook Yang, Daejeon (KR); JaeHun Yang, Daejeon (KR); Jong Moon Yoon, Daejeon (KR); Ju Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 1550 days.

This patent is subject to a terminal disclaimer.

(21) Appl. No.: 12/966,250

(22) Filed: Dec. 13, 2010

(65) Prior Publication Data

US 2011/0195285 A1 Aug. 11, 2011

Related U.S. Application Data

(63) Continuation-in-part of application No. 12/224,526, filed as application No. PCT/KR2007/001019 on Feb. 28, 2007, now Pat. No. 7,875,378.

(30) Foreign Application Priority Data

Mar. 6, 2006 (KR) .......... 10-2006-0020772
May 29, 2006 (KR) .......... 10-2006-0047891

(51) Int. Cl.
*H01M 10/04* (2006.01)
*H01M 2/26* (2006.01)
*H01M 2/22* (2006.01)

(52) U.S. Cl.
CPC .......... *H01M 10/0413* (2013.01); *H01M 2/22* (2013.01); *H01M 2/266* (2013.01); *H01M 10/0436* (2013.01)

(58) Field of Classification Search
CPC .......... H01M 2/266; H01M 10/0413; H01M 10/0436; H01M 10/48–10/488

USPC .............. 429/61, 96, 98, 100, 159, 176
See application file for complete search history.

(56) References Cited

U.S. PATENT DOCUMENTS

| 4,278,744 A | 7/1981 | Athearn |
| 4,957,829 A | 9/1990 | Holl |

(Continued)

FOREIGN PATENT DOCUMENTS

| EP | 957526 A1 | 11/1999 |
| JP | 61-171065 A | 8/1986 |

(Continued)

OTHER PUBLICATIONS

Office Action from Korean Patent Application No. 10-2006-0020772 dated Feb. 4, 2010.

(Continued)

*Primary Examiner* — Maria J Laios
*Assistant Examiner* — Robert S Carrico
(74) *Attorney, Agent, or Firm* — Lerner, David, Littenberg, Krumholz & Mentlik, LLP (57) ABSTRACT

Disclosed herein is a voltage sensing member for sensing the voltage of battery cells constituting a battery module, the voltage sensing member comprising: (a) a pair of supporting parts mounted to the bottom of the battery module at regions (the front and rear parts of the battery module) corresponding to electrode terminal connections of the battery cells; (b) connection parts for electrically connecting the supporting parts to a connector; (c) a plurality of conductive sensing parts protruding upward while one end of each is connected to the corresponding support part and the other end of each is elastically connected to electrode terminals of the battery cells; and (d) the connector mounted on the front part or the rear part of the battery module for transmitting the sensed voltage of the battery cells to a battery management system (BMS).

17 Claims, 8 Drawing Sheets

(56) References Cited

U.S. PATENT DOCUMENTS

| | | |
|---|---|---|
| 5,366,827 A | 11/1994 | Belanger et al. |
| 5,437,939 A | 8/1995 | Beckley |
| 5,510,203 A | 4/1996 | Hamada et al. |
| 5,558,950 A | 9/1996 | Ovshinsky et al. |
| 5,639,571 A | 6/1997 | Waters et al. |
| 5,981,101 A | 11/1999 | Stone |
| 6,191,591 B1 | 2/2001 | Ratajczak et al. |
| 6,225,778 B1 | 5/2001 | Hayama et al. |
| 6,304,057 B1 | 10/2001 | Hamada et al. |
| 6,379,837 B1 | 4/2002 | Takahashi et al. |
| 6,410,184 B1 | 6/2002 | Horiuchi et al. |
| 6,482,544 B1 | 11/2002 | Shiota et al. |
| 6,569,561 B1 | 5/2003 | Kimura et al. |
| 6,773,848 B1 | 8/2004 | Nortoft et al. |
| 6,818,343 B1 | 11/2004 | Kimoto et al. |
| 6,896,995 B2 | 5/2005 | Saito |
| 7,597,996 B2 | 10/2009 | Ro et al. |
| 7,648,538 B2 | 1/2010 | Oogami et al. |
| 7,892,669 B2 | 2/2011 | Yang et al. |
| 8,329,324 B2 * | 12/2012 | Lee et al. .................. 429/61 |
| 2002/0009649 A1 | 1/2002 | Sato et al. |
| 2002/0150815 A1 | 10/2002 | Ehara |
| 2002/0182480 A1 | 12/2002 | Hanauer et al. |
| 2003/0048090 A1 | 3/2003 | Sato et al. |
| 2003/0215702 A1 | 11/2003 | Tanjou et al. |
| 2004/0021442 A1 | 2/2004 | Higashino |
| 2004/0033415 A1 | 2/2004 | Chen et al. |
| 2004/0036444 A1 | 2/2004 | Oogami |
| 2004/0050414 A1 | 3/2004 | Oogami |
| 2004/0055922 A1 | 3/2004 | Ordonez |
| 2004/0119442 A1 | 6/2004 | Lee et al. |
| 2004/0253512 A1 | 12/2004 | Watanabe et al. |
| 2005/0031946 A1 | 2/2005 | Kruger et al. |
| 2005/0069763 A1 | 3/2005 | Hong et al. |
| 2005/0089751 A1 | 4/2005 | Oogami et al. |
| 2005/0100783 A1 | 5/2005 | Ro et al. |
| 2005/0110460 A1 | 5/2005 | Arai et al. |
| 2005/0215296 A1 | 9/2005 | Fujihara et al. |
| 2006/0040173 A1 | 2/2006 | Shimamura et al. |
| 2006/0061330 A1 | 3/2006 | Sato et al. |
| 2006/0093899 A1 | 5/2006 | Jeon et al. |
| 2006/0176014 A1 | 8/2006 | Moon |
| 2006/0177734 A1 | 8/2006 | Yao |
| 2006/0183017 A1 | 8/2006 | Kanai |

FOREIGN PATENT DOCUMENTS

| | | |
|---|---|---|
| JP | 10-129276 A | 5/1998 |
| JP | 2002-313398 A | 10/2002 |
| JP | 2003-68259 A | 3/2003 |
| JP | 2003-123721 A | 4/2003 |
| JP | 2005-108693 | 4/2005 |
| JP | 2005-122927 A | 5/2005 |
| JP | 2005-197179 A | 7/2005 |
| JP | 2005-209365 A2 | 8/2005 |
| JP | 2005-222701 A | 8/2005 |
| JP | 2005-293907 A | 10/2005 |
| JP | 2005-302501 A | 10/2005 |
| JP | 2006-66322 | 3/2006 |
| JP | 3891860 B2 | 3/2007 |
| KR | 20060047061 A | 5/2006 |
| TW | 2004-14583 | 8/2001 |
| TW | 543217 B | 7/2003 |
| TW | 2006-03456 | 1/2006 |
| WO | 03/019703 A1 | 3/2003 |
| WO | 2004/049470 A2 | 6/2004 |
| WO | 2005/074054 A1 | 8/2005 |
| WO | 2006/030659 A1 | 3/2006 |
| WO | 2006/059434 A1 | 6/2006 |
| WO | 2007079449 A2 | 7/2007 |
| WO | 2007091757 A1 | 8/2007 |

OTHER PUBLICATIONS

U.S. Appl. No. 12/224,526.
U.S. Appl. No. 12/224,687.
U.S. Appl. No. 12/224,688.
U.S. Appl. No. 12/224,689.

* cited by examiner

VOLTAGE SENSING MEMBER AND BATTERY MODULE EMPLOYED WITH THE SAME

CROSS REFERENCE TO RELATED APPLICATIONS

This application is a continuation-in-part of U.S. application Ser. No. 12/224,526, filed on Apr. 7, 2009, which is a national phase entry under 35 U.S.C. §371 of International Application No. PCT/KR2007/001019, filed Feb. 28, 2007, published in English, which claims the benefit of Korean Patent Application Nos. KR10-2006-0020772, filed Mar. 6, 2006 and KR10-2006-0047891, filed May 29, 2006, the disclosures of which are incorporated herein by reference.

FIELD OF THE INVENTION

The present invention relates to a voltage sensing member for sensing the voltage of battery cells constituting a battery module, and, more particularly, to a voltage sensing member comprising a pair of supporting parts mounted to the front and rear parts of the battery module, connection parts for electrically connecting the supporting parts to a connector, a plurality of conductive sensing parts protruding upward while one end of each is connected to the corresponding support part and the other end of each is elastically connected to electrode terminals of the battery cells, and the connector mounted on the front part or the rear part of the battery module for transmitting the sensed voltage of the battery cells to a battery management system (BMS).

BACKGROUND OF THE INVENTION

Recently, a secondary battery, which can be charged and discharged, has been widely used as an energy source for wireless mobile devices. Also, the secondary battery has attracted considerable attention as an energy source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small and the manufacturing costs of the pouch-shaped battery are low.

Also, since a battery module is a structural body including a plurality of battery cells which are combined with each other, the safety and the operating efficiency of the battery module are lowered when overvoltage, overcurrent, and overheat occurs in some of the battery cells. Consequently, a sensing unit for sensing the overvoltage, overcurrent, and overheat is needed. Specifically, a voltage sensor is connected to the battery cells so as to sense and control the operation of the battery cells in real time or at predetermined time intervals. However, the attachment or the connection of the sensing unit complicates the assembly process of the battery module. In addition, short circuits may occur due to the provision of a plurality of wires necessary for the attachment or the connection of the sensing unit. Also, as the secondary batteries are used as a power source for vehicles due to the extension in application of the secondary batteries, there is needed a coupling unit for maintaining the elastic and stable contact between the sensing unit and the secondary batteries when strong impact or vibration is applied to the battery module.

In addition, when a middle- or large-sized battery module is constructed using a plurality of battery cells or a plurality of unit modules each of which includes a predetermined number of battery cells, a plurality of members for mechanical coupling and electrical connection between the battery cells or the unit modules are needed, and a process for assembling the mechanical coupling and electrical connection members is very complicated. Furthermore, there is needed a space for coupling, welding, or soldering the mechanical coupling and electrical connection members with the result that the total size of the system is increased. The increase in size of the system is not preferred in the above-described aspect. Consequently, there is high necessity for a battery module that is compact and structurally stable.

SUMMARY OF THE INVENTION

Therefore, the present invention has been made to solve the above problems, and other technical problems that have yet to be resolved.

Specifically, it is an object of the present invention to provide a voltage sensing member that is manufactured by a simple assembly process without using a plurality of members for mechanical coupling and electrical connection.

It is another object of the present invention to provide a voltage sensing member that is maintained in elastic and stable contact when external impact or frequent vibration is applied to the voltage sensing member during the assembly or the operation of the voltage sensing member.

It is a further object of the present invention to provide a middle- or large-sized battery module that is manufactured with desired output and capacity including the voltage sensing member.

In accordance with one aspect of the present invention, the above and other objects can be accomplished by the provision of a voltage sensing member for sensing the voltage of battery cells constituting a battery module, the voltage sensing member comprising:

(a) a pair of supporting parts mounted to the bottom of the battery module at regions (the front and rear parts of the battery module) corresponding to electrode terminal connections of the battery cells;

(b) connection parts for electrically connecting the supporting parts to a connector;

(c) a plurality of conductive sensing parts protruding upward while one end of each is connected to the corresponding support part and the other end of each is elastically connected to electrode terminals of the battery cells; and (d) the connector mounted on the front part or the rear part of the battery module for transmitting the sensed voltage of the battery cells to a battery management system (BMS).

Consequently, the voltage sensing member is constructed in a structure in which the conductive sensing parts are mounted on the pair of supporting parts mounted to the bottom of the battery module at the front and rear parts of the battery module while the conductive sensing parts are in elastic contact with the electrode terminals of the battery cells, and the sensed voltage of the battery cells are transmitted to a battery management system (BMS) by a connector. Consequently, a process for assembling the voltage sensing member is simple, and the voltage sensing member is constructed in a compact structure to stably sense the voltage of the battery cells.

In a preferred embodiment, the supporting part and connection part are formed of a single linear member, serve to transmit the sensed voltage of the battery cells to a battery management system (BMS) via the connector. Preferably, therefore, the linear member is formed of a wire.

Preferably, the other end of the conductive sensing part elastically connected to electrode terminals of the battery cells is formed of an elastic clamp structure. Therefore, a connection of the conductive sensing part and electrode terminals of the battery cells can be achieved easily.

Preferably, the conductive sensing parts are mounted in an insulative housing. Therefore, the insulative housing prevents a breakage of the conductive sensing parts from external force and can achieve an isolation of the conductive sensing parts from the outside.

In accordance with another aspect of the present invention, there is provided a battery module including the voltage sensing member constructed as described above.

In a preferred embodiment, the battery module comprises:

(a) a battery cell stack including a plurality of battery cells or unit modules connected in series and/or parallel with each other, the battery cells or unit modules being erected in the lateral direction;

(b) an upper case constructed in a structure to entirely surround one side end of the battery cell stack and to partially surround the upper and lower ends of the battery cell stack, the upper case being provided at the front part thereof with external input and output terminals;

(c) a lower case coupled with the upper case, the lower case being constructed in a structure to entirely surround the other side end of the battery cell stack and to partially surround the upper and lower ends of the battery cell stack, the lower case being provided at the front part thereof with bus bars for connecting electrode terminals of the battery cell stack to the external input and output terminals, the lower case being provided at the bottom thereof with the voltage sensing member; and (d) a front cover mounted to the front part of the lower case for protecting connections between the electrode terminals of the battery cells and the bus bars from the outside, the front cover being made of an insulative material.

In a battery module including a plurality of battery cells, it is necessary to measure and control the voltage and temperature of the battery cells in consideration of the safety and operational efficiency of the battery module. Especially, it is necessary to measure the voltage of the respective battery cells or the respective electrical connection regions of the battery cells. For this reason, the attachment of a sensing member for measuring the voltage or temperature of the battery cells is one of the principal factors further complicating the construction of the battery module.

The above-mentioned problem may be solved by the provision of a sensing member mounted along one of the cases, i.e., the upper case or the lower case, for sensing the voltage and/or temperature of the battery cells in accordance with the present invention. Specifically, as described above, the sensing member includes sensing parts mounted in spaces defined on the front and rear parts of the lower case. As described above, the sensing member may be a voltage sensing member. According to circumstances, the sensing member may be a temperature sensing member.

In a preferred embodiment, the lower case is provided at the front and rear parts thereof with spaces in which conductive sensing parts of the voltage sensing member are mounted, the lower case is provided at the bottom thereof with spaces in which the supporting parts and the conduction part of the voltage sensing member are mounted, and the conductive sensing parts are in elastic contact with the lower ends of the electrode terminals of the battery cells and/or series-connection bent regions of the electrode terminals of the battery cells, whereby the electrical contact therebetween is stably maintained when external impact is applied to the battery module.

The lower case is provided at the bottom thereof with a depression in which the connection part is inserted, whereby the battery module is constructed in a compact structure.

As described above, the battery cell stack is mounted in the cases in such a manner that the plurality of battery cells or unit modules are erected in the lateral direction. In the specification, regions of the battery cells or the unit modules where the electrode terminals of the battery cells or the unit modules protrude are defined as front and rear directions, and the opposite side edges of the battery cells or the unit modules are defined as a lateral direction. Consequently, the battery cell stack is constructed in a structure in which the battery cells or the unit modules are erected such that one of the side edges of the battery cells or the unit modules is erected with respect to the ground while the electrode terminals of the battery cells or the unit modules are oriented in the front and rear directions of the battery module.

Preferably, the battery cell stack comprises a plurality of unit modules each including plate-shaped battery cells having electrode terminals formed at the upper and lower ends thereof. Each unit module comprises two or more battery cells constructed in a stacked structure in which electrode terminals of the battery cells are connected in series with each other and the electrode terminal connections are bent such that the battery cells are stacked, and a pair of high-strength cell covers for surrounding the outer surfaces of the battery cell stack excluding the electrode terminals of the battery cells when the cell covers are coupled with each other.

The battery cells are connected in series and/or parallel with each other in one unit module, or the battery cells of one unit module are connected in series and/or parallel with the battery cells of another unit module. In the preferred embodiment described above, a plurality of unit modules are manufactured by coupling electrode terminals of the battery cells to each other, while arranging the battery cells in series in the longitudinal direction, such that the electrode terminals of the battery cells are successively adjacent to each other, bending the battery cells by twos or more such that the battery cells are stacked while being in tight contact with each other, and surrounding the stacked battery cells by predetermined numbers with the cell covers. The sequence of the manufacturing processes may be partially changed. For example, the plurality of unit modules may be manufactured, and then the electrical connection between the unit modules may be performed.

The battery cell stack, in which the battery cells are stacked in high integration while the electrode terminals of the battery cells are connected with each other, is vertically mounted in the separable upper and lower cases that are coupled with each other in the assembly-type coupling structure.

Preferably, the upper and lower cases are constructed in a structure to surround the edge of the battery cell stack and expose the outer surfaces of the battery cell stack to the outside so as to accomplish easy heat dissipation of the battery cell stack when the upper and lower cases are coupled with each other after the battery cell stack is mounted in the upper and lower cases. Consequently, as described above, the upper case is constructed in a structure to entirely surround one side end of the battery cell stack and to partially surround the upper and lower ends of the battery cell stack, and the lower case is constructed in a structure to entirely surround the other side end of the battery cell stack and to partially surround the upper and lower ends of the battery cell stack.

In a preferred embodiment, the lower case is provided at the front and rear parts thereof with spaces in which the conductive sensing parts of the voltage sensing member are inserted, and the sensing parts are in elastic contact with the lower ends of the electrode terminals of the battery cells and/or electrical connection bent regions (electrode terminal connections) of the electrode terminals of the battery cells.

In another preferred embodiment the outermost electrode terminals of the battery cell stack are connected to the bus bars located at the front part of the lower case.

In the above structure, the conductive sensing parts of the voltage sensing member that are connected to the outermost electrode terminals are mounted on the supporting part such that the conductive sensing parts are rotated by a predetermined angle corresponding to the outermost electrode terminals. Therefore, the conductive sensing parts can easily detect the voltage of the outermost electrode terminals.

The upper and lower cases are coupled with each other by mounting the battery cell stack to one of the upper and lower cases (for example, the lower case) and coupling the other case (for example, the upper case) to the frame member in which the battery cell stack is mounted. The coupling between the upper and lower cases may be accomplished in various manners. For example, screws may be threadedly inserted into thread grooves formed at the opposite sides of the cases. Alternatively, a hook may be formed at one of the cases, and a coupling hole corresponding to the hook may be formed in the other case, whereby the coupling between the upper and lower cases is accomplished without using an additional coupling member.

Also, the sensing parts of the voltage sensing member are mounted in the front and rear parts of the lower case. The sensing parts mounted in the rear part of the lower case may be directly connected to the connector mounted to the rear part of the lower case, and the sensing parts mounted in the front part of the lower case may be connected to the connector via the conduction part mounted to the bottom of the lower case.

Preferably, insulative covers are further disposed on the outer surfaces of the supporting parts mounted to the bottom of the lower case, thereby increasing isolation of the supporting parts from the outside.

In a preferred embodiment, a temperature sensor is protruded upward from the lower case while the temperature sensor is mounted between battery cells or unit modules, thereby detecting the temperature of the battery cells as well as the voltage of the battery cells.

The battery module according to the present invention is constructed in a compact structure, and the mechanical coupling and electrical connection of the battery module are stably accomplished without using a plurality of members. Also, it is possible to construct a battery module using a predetermined number of battery cells, for example, four, six, eight, or ten battery cells, thereby effectively mounting a necessary number of battery modules in a limited space.

In accordance with a further aspect of the present invention, there is provided a middle- or large-sized battery system having high output and large capacity, the battery system being constructed by connecting a plurality of battery modules.

The middle- or large-sized battery system according to the present invention may be manufactured by combining unit modules based on desired output and capacity. The battery system according to the present invention is preferably used as a power source for electric vehicles, hybrid electric vehicles, electric motorcycles, or electric bicycles, which have a limit installation space and are exposed to frequent vibration and strong impact in consideration of the installation efficiency and structural stability of the battery system, or as an electric power storage device.

DESCRIPTION OF DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
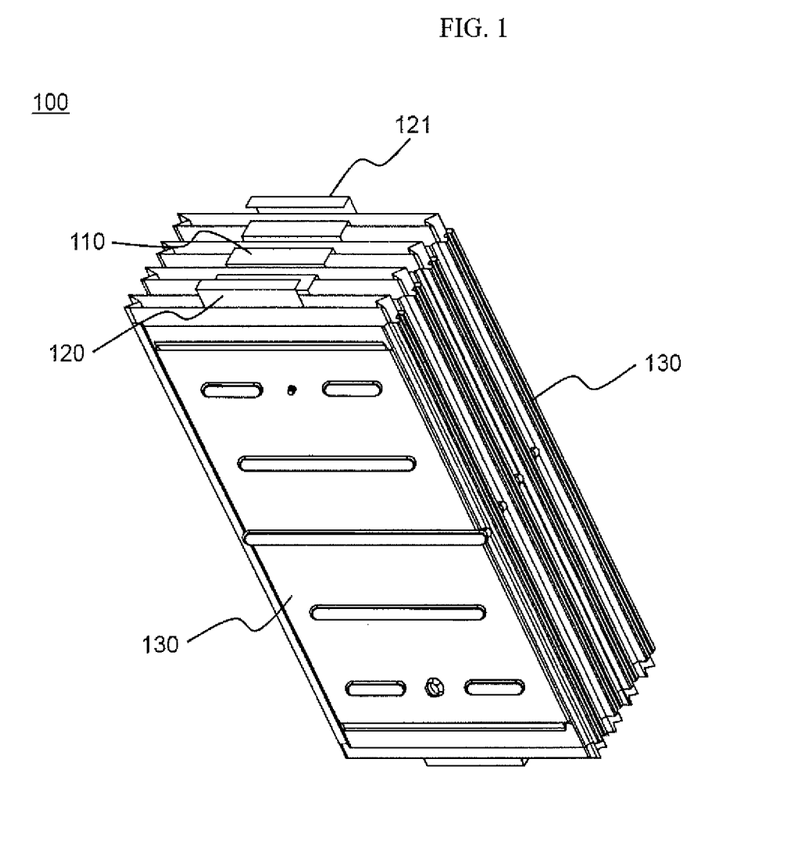
FIG. 1 is a perspective view illustrating a battery cell stack including a plurality of unit modules.

FIG. 1 is a perspective view illustrating a battery cell stack including a plurality of unit modules.

Referring to FIG. 1, the battery cell stack 100 includes four unit modules 130. Two battery cells (not shown) are mounted in each unit module 130. Consequently, a total of eight battery cells are included in the battery cell stack 100. Electrode terminals of the neighboring battery cells are connected in series with each other, and electrode terminals of the neighboring unit modules are also connected in series with each other. Electrode terminal connections 110 are bent in the sectional shape of a '[' to construct the battery cell stack. Outside electrode terminals 120 and 121 of the outermost unit modules 130 are bent inward in the sectional shape of a ']' such that the electrode terminals 120 and 121 protrude slightly more than the electrode terminal connections 110.

Figure 2:
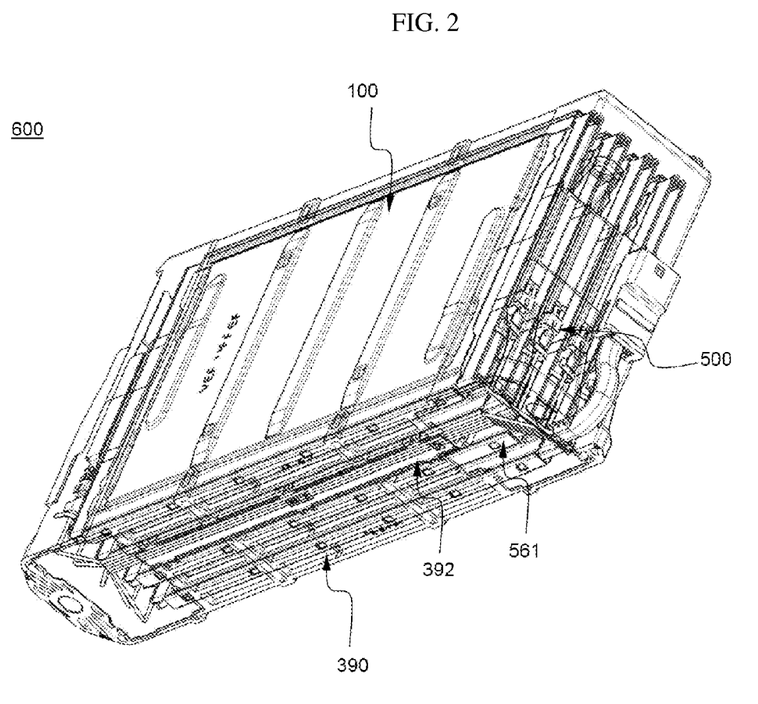
FIG. 2 is a perspective view illustrating a battery module according to a preferred embodiment of the present invention.
Figure 3:
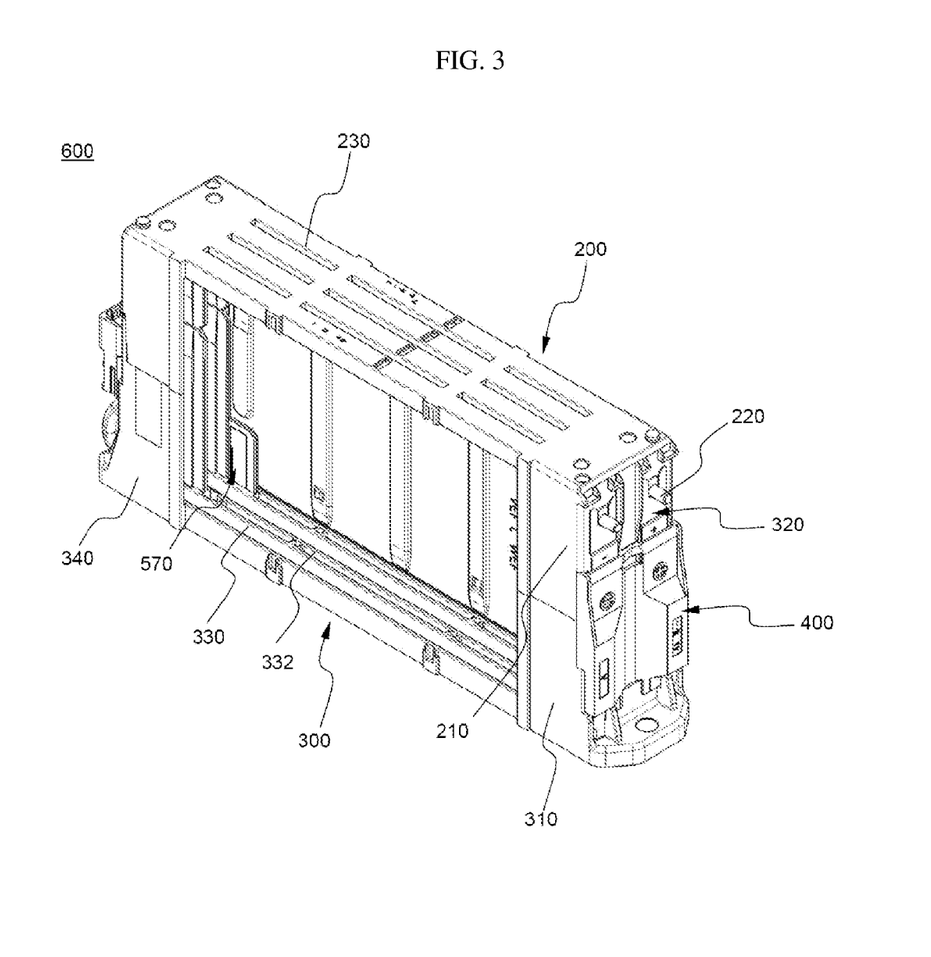
FIG. 3 is a perspective view illustrating a structure, which a portion of the battery cell stack of FIG. 1 is mounted in the upper and lower case.

FIG. 2 is a perspective view illustrating a battery module according to a preferred embodiment of the present invention, and FIG. 3 is a perspective view illustrating a structure, which a portion of the battery cell stack of FIG. 1 is mounted in the upper and lower case.

Referring to these drawings with FIG. 1, the battery module includes a battery cell stack 100, and an upper case 200, a lower case 300, and a front cover 400.

The upper case 200 is constructed in a structure to entirely surround one side end of the battery cell stack 100 and to partially surround the upper and lower ends of the battery cell stack 100. The upper case 200 is provided at the front part 210 thereof with a pair of external input and output terminals 220.

The battery cell stack 100 is mounted to the lower case 300 such that the plurality of unit modules 130 are erected in the lateral direction.

The lower case 300 is constructed in a structure to entirely surround the other side end of the battery cell stack 100 and to partially surround the upper and lower ends of the battery cell stack 100. The lower case 300 is coupled with the upper case 200. The lower case 300 is provided at the front part 310 thereof with a pair of bus bars 320 for connecting electrode terminals of the battery cell stack 100 to the external input and output terminals 220. Specifically, the upper and lower cases 200 and 300 are constructed in a structure in which, when the upper and lower cases 200 and 300 are coupled with each other, the upper and lower cases 200 and 300 surround only the edge of the battery cell stack 100, such that the outer surface of the battery cell stack 100 is exposed to the outside, so as to accomplish easy heat dissipation of the battery cell stack 100.

Figure 7:
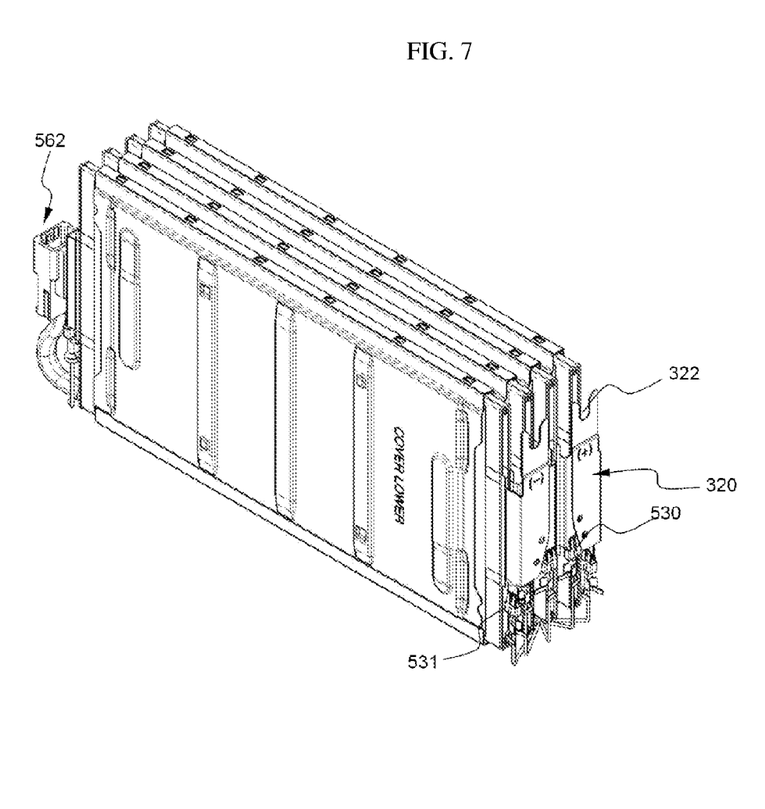
FIGS. 7 and 8 are perspective views illustrating the coupling between the voltage sensing member of FIG. 4 and the battery cell stack.

The upper end of each bus bar 320 is formed in the shape of a depression such that the external input and output terminals 220 provided at the front part 210 of the upper case 200 are inserted into the depressions FIG. 7: 322 of the bus bars 320 when the upper and lower cases 200 and 300 are coupled with each other.

In the insides of the upper case 200 and the lower case 300 are formed a plurality of mounting grooves 330 in which the edges of the battery cells or the unit modules are inserted. The mounting grooves 330 are constructed in a structure in which steps formed at the edges of the unit modules 130 are fitted in the corresponding mounting grooves 330.

Also, the upper case 200 and the lower case 300 are provided with a plurality of through-holes 230 and 332, through which a coolant (normally, air) flows, respectively, whereby effective cooling is accomplished while the battery cell stack 100 is mounted in the upper case 200 and the lower case 300.

To the front part 310 of the lower case 300 is mounted a front cover 400 for protecting connections between the electrode terminals of the battery cells and the bus bars from the outside. The front cover 400 is made of an insulative material.

Figure 4:
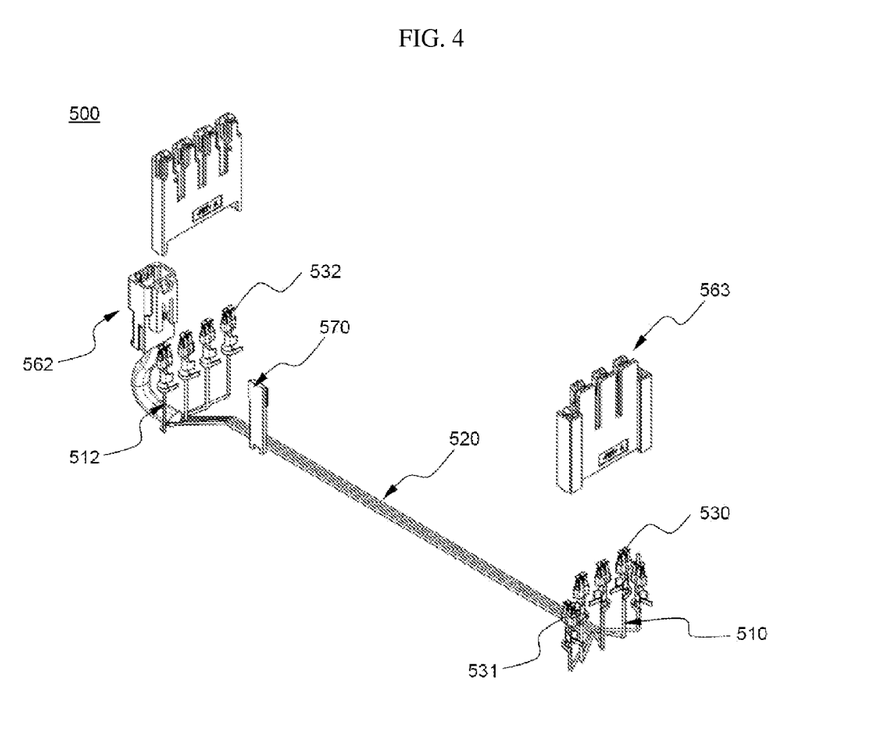
FIG. 4 is a perspective view illustrating a voltage sensing member according to a preferred embodiment of the present invention.
Figure 5:
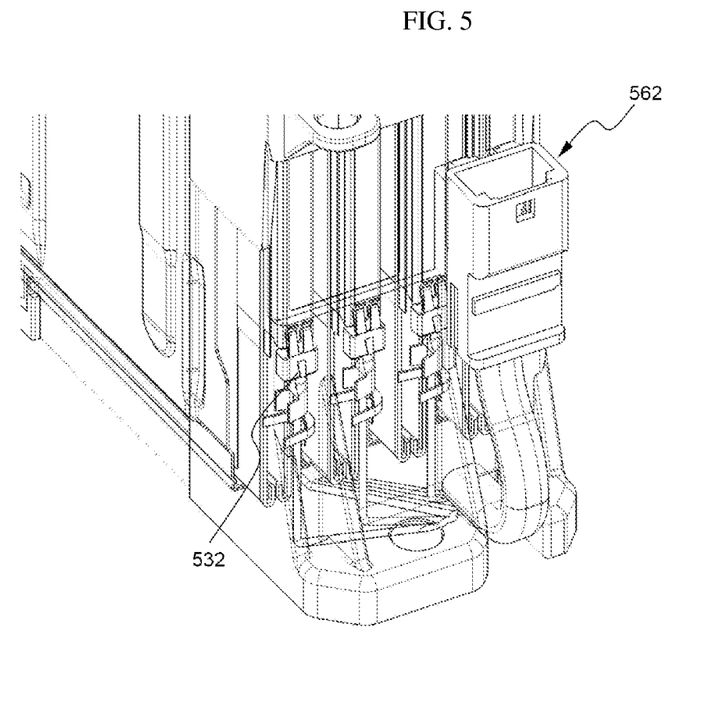
FIGS. 5 and 6 are partially enlarged views respectively illustrating the structure, which the voltage sensing member of FIG. 4 is mounted in the rear part of the battery module.
Figure 6:
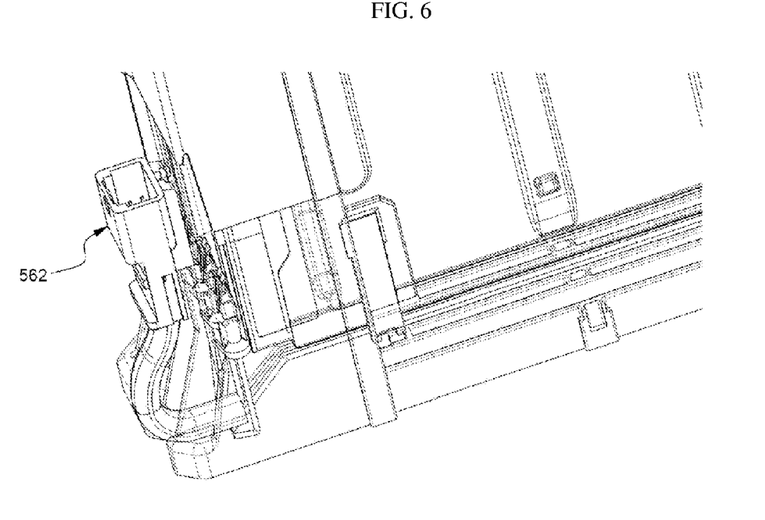

FIG. 4 is a perspective view illustrating a voltage sensing member according to a preferred embodiment of the present invention, and FIGS. 5 and 6 are partially enlarged views respectively illustrating the structure, which the voltage sensing member of FIG. 4 is mounted in the rear part of the battery module.

Figure 8:
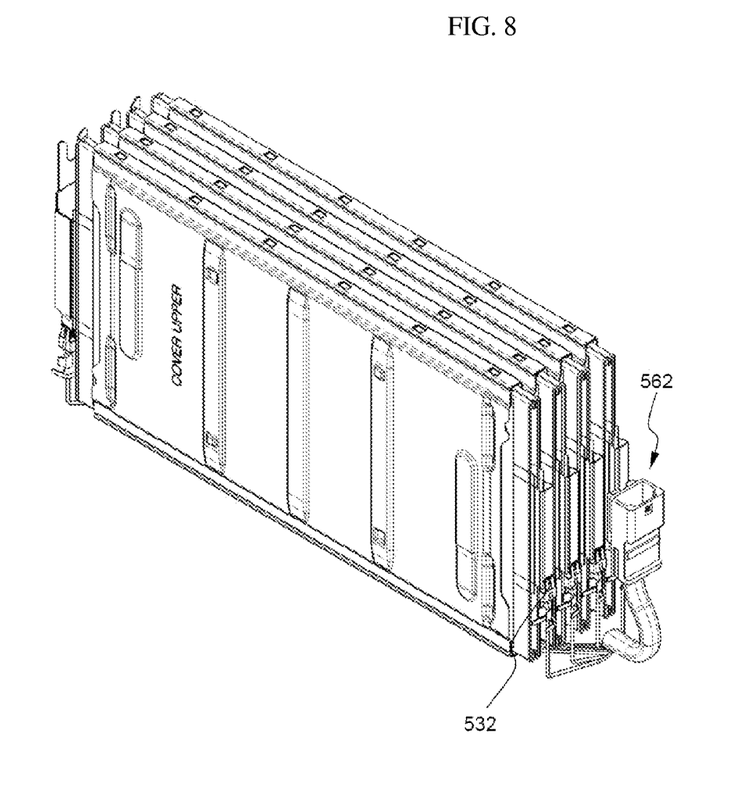

Also, FIGS. 7 and 8 are perspective views illustrating the coupling between the voltage sensing member of FIG. 4 and the battery cell stack.

Referring to these drawings with FIGS. 1 to 3, the voltage sensing member 500 includes 10 of supporting parts 510 and 512 mounted to the bottom of the battery module at regions corresponding to the electrode terminal connections 110 of the battery cells, connection parts 520 for electrically interconnecting the supporting parts 510 to the connector 562, 10 of conductive sensing parts 530, 531, 532 protruding upward while one end of each is connected to the corresponding support part 510, 512 and the other end of each is elastically connected to the corresponding electrode terminal connection 110, a connector 562 mounted on the rear part of the battery module for transmitting the sensed voltage of the battery cells from conductive sensing parts 530, 531, 532 to a BMS (not shown), and an insulative cover 561 mounted to the bottom of the voltage sensing member 500.

Also, the supporting parts 510, 512 and connection parts 520 are formed of wires as a single linear member.

The conductive sensing parts 530, 532 are constructed in a structure in which the conductive sensing parts 530, 532 are in elastic contact with the lower ends of the electrode terminals of the battery cells and/or the series-connection bent regions of the electrode terminals of the battery cells, i.e., the lower end of the electrode terminal connections 110. Also, the conductive sensing parts 531 formed at the front part 310 of the lower case 300, which are connected to the outermost electrode terminals 120, are mounted on the supporting part 510 such that the conductive sensing parts 531 are rotated by 90 degrees to face the insides of the outermost electrode terminals 120.

Also, the other end of the conductive sensing parts 530, 531, 532 are formed of an elastic clamp structure, and the conductive sensing parts 530, 531, 532 are mounted in an insulative housing 563. Therefore, the elastic contact between the sensing parts and the electrode terminals or the electrode terminal connections is accomplished, and the electrical connection between the sensing parts and the electrode terminals or the electrode terminal connections is stably maintained when external impact is applied to the battery module. The elastic clamps are constructed in a structure to sense the voltage of the battery cells from the respective electrode terminals of the battery cells or the unit modules.

The lower case 300 is provided at the bottom 390 thereof with a depression 392 in which the connection part 520 is inserted. Consequently, the voltage sensing member 500 is mounted to the front part 310, the rear part 540, and the bottom 590 of the lower case 300 in an insertion fashion. Consequently, the battery module 600 is easily assembled and constructed in a compact and stable structure.

The conductive sensing parts 530, 531, 532 of the voltage sensing member 500 are mounted in spaces defined on the front and rear parts 310, 340 of the lower case 300, respectively, and the supporting parts 510 and the conduction part 520 of the voltage sensing member 500 are mounted to the bottom 390 of the lower case 300.

Specifically, the lower case 300 is provided at the front and rear parts 310, 340 thereof with internal spaces in which the conductive sensing parts 530, 531, 532 of the voltage sensing member 500 are inserted, and the sensing parts 530, 532 are in elastic contact with the lower ends of the electrode terminal connections 110.

Also, the outermost electrode terminals 120, 121 of the battery cell stack 100 are connected to the bus bars 320 located at the front part 310 of the lower case, and a temperature sensor 570 protruding upward from the lower case 300 while the temperature sensor 570 is mounted between battery cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the voltage sensing member according to the present invention is manufactured by a simple assembly process without using a plurality of members for mechanical coupling and electrical connection. Consequently, the present invention has the effect of reducing the manufacturing costs of the voltage sensing member. Also, the voltage sensing member is maintained in elastic and stable contact when external impact or frequent vibration is applied to the voltage sensing member. Consequently, the present invention has the effect of performing a stable voltage sensing operation. Furthermore, the present invention has the effect of manufacturing a middle- or large-sized battery system having desired output and capacity using a battery module including the voltage sensing member as a unit body.

What is claimed is:

1. A voltage sensing member for sensing the voltage of battery cells constituting a battery module, the voltage sensing member comprising:
   (a) a pair of supporting parts mounted to the bottom of the battery module at the front and rear parts of the battery module corresponding to electrode terminal connections of the battery cells;
   (b) connection parts for electrically connecting the supporting parts to a connector;
   (c) a plurality of conductive sensing parts protruding upward while one end of each is connected to the corresponding support part and the other end of each is elastically connected to electrode terminals of the battery cells; and
   (d) the connector mounted on the front part or the rear part of the battery module for transmitting the sensed voltage of the battery cells to a battery management system (BMS).

2. The voltage sensing member according to claim 1, wherein the supporting part and connection part are formed of a single linear member.

3. The voltage sensing member according to claim 2, wherein the linear member is a wire.

4. The voltage sensing member according to claim 1, wherein the other end of the conductive sensing part elastically connected to electrode terminals of the battery cells is formed of an elastic clamp structure.

5. The voltage sensing member according to claim 1, further comprising an insulative housing in which the conductive sensing parts are mounted.

6. A battery module including a voltage sensing member according to claim 1.

7. The battery module according to claim 6, wherein the battery module comprises:
   (a) a battery cell stack including a plurality of battery cells or unit modules connected in series and/or parallel with each other, the battery cells or unit modules being erected in the lateral direction;
   (b) an upper case constructed in a structure to entirely surround one side end of the battery cell stack and to partially surround the upper and lower ends of the battery cell stack, the upper case being provided at the front part thereof with external input and output terminals;
   (c) a lower case coupled with the upper case, the lower case being constructed in a structure to entirely surround the other side end of the battery cell stack and to partially surround the upper and lower ends of the battery cell stack, the lower case being provided at the front part thereof with bus bars for connecting electrode terminals of the battery cell stack to the external input and output terminals, the lower case being provided at the bottom thereof with the voltage sensing member; and
   (d) a front cover mounted to the front part of the lower case for protecting connections between the electrode terminals of the battery cells and the bus bars from the outside, the front cover being made of an insulative material.

8. The battery module according to claim 7, wherein the conductive sensing parts of the voltage sensing member are mounted in spaces defined on the front and rear parts of the lower case, respectively, and the supporting parts and the conduction part of the voltage sensing member are mounted to the bottom of the lower case.

9. The battery module according to claim 8, wherein the lower case is provided at the bottom thereof with a depression in which the connection part is inserted.

10. The battery module according to claim 7, wherein the battery cell stack comprises a plurality of unit modules each including plate-shaped battery cells having electrode terminals formed at the upper and lower ends thereof, and
   each unit module comprises two or more battery cells constructed in a stacked structure in which electrode terminals of the battery cells are connected in series with each other and the electrode terminal connections are bent such that the battery cells are stacked, and a pair of high-strength cell covers for surrounding the outer surfaces of the battery cells excluding the electrode terminals of the battery cells when the cell covers are coupled with each other.

11. The battery module according to claim 7, wherein the lower case is provided at the front and rear parts thereof with spaces in which the conductive sensing parts of the voltage sensing member are inserted, and the sensing parts are in elastic contact with the lower ends of the electrode terminals of the battery cells and/or electrical connection bent regions (electrode terminal connections) of the electrode terminals of the battery cells.

12. The battery module according to claim 7, wherein the outermost electrode terminals of the battery cell stack are connected to the bus bars located at the front part of the lower case.

13. The battery module according to claim 12, wherein the conductive sensing parts of the voltage sensing member that are connected to the outermost electrode terminals are mounted on the supporting part such that the conductive sensing parts are rotated by a predetermined angle corresponding to the outermost electrode terminals.

14. The battery module according to claim 8, further comprising:
   insulative covers further disposed on the outer surfaces of the supporting parts mounted to the bottom of the lower case.

15. The battery module according to claim 7, further comprising a temperature sensor protruding upward from the lower case while the temperature sensor is mounted between battery cells or unit modules.

16. A middle- or large-sized battery system having high output and large capacity, the battery system being manufactured using a battery module according to claim 6 as a unit body.

17. The battery system according to claim 16, wherein the battery system is used as a power source for electric vehicles or hybrid electric vehicles or as an electric power storage device.

* * * * *